United States Patent
Xiong et al.

(10) Patent No.: US 9,996,256 B2
(45) Date of Patent: Jun. 12, 2018

(54) METHOD FOR ERASING ELECTRONIC HANDWRITING ON A CLIPBOARD

(71) Applicant: Fujian Foxit Software Development Joint Stock Co., Ltd., Fuzhou (CN)

(72) Inventors: Yuqian Xiong, Beijing (CN); Sunliang Liu, Beijing (CN); Yinsen Yan, Beijing (CN)

(73) Assignee: Fujian Foxit Software Development Joint Stock Co., Ltd., Fuzhou (CN)

( * ) Notice: Subject to any disclaimer, the term of this patent is extended or adjusted under 35 U.S.C. 154(b) by 28 days.

(21) Appl. No.: 15/318,462

(22) PCT Filed: Jun. 19, 2014

(86) PCT No.: PCT/CN2014/000606
§ 371 (c)(1),
(2) Date: Dec. 13, 2016

(87) PCT Pub. No.: WO2015/192271
PCT Pub. Date: Dec. 23, 2015

(65) Prior Publication Data
US 2017/0153808 A1    Jun. 1, 2017

(51) Int. Cl.
*G06F 3/0488*  (2013.01)
*G06T 11/00*  (2006.01)

(52) U.S. Cl.
CPC ........ *G06F 3/04883* (2013.01); *G06T 11/001* (2013.01)

(58) Field of Classification Search
CPC ............................ G06F 3/04883; G06T 11/001
See application file for complete search history.

(56) References Cited

U.S. PATENT DOCUMENTS

| | | | | |
|---|---|---|---|---|
| 2007/0040813 A1* | 2/2007 | Kushler | ................ | G06F 3/0237 345/173 |
| 2008/0292218 A1* | 11/2008 | Anderson | ............. | G06T 11/001 382/311 |

(Continued)

FOREIGN PATENT DOCUMENTS

| CN | 101178633 | 5/2008 |
|---|---|---|
| CN | 101477694 | 7/2009 |

(Continued)

OTHER PUBLICATIONS

International Search Report of PCT/CN2014/000606 dated Jan. 4, 2015, 4 pages (English and Chinese).

*Primary Examiner* — Andrew Sasinowski
(74) *Attorney, Agent, or Firm* — Rankin, Hill & Clark LLP

(57) ABSTRACT

A method for erasing electronic handwriting on a clipboard includes: the coordinates of each handwriting point of the electronic handwriting are made to correspond to writing pressure on the clipboard and are stored, and the color depth of each handwriting point is made to be proportional to the writing pressure at the handwriting point; the coordinates of each erase point, on the clipboard, contacted by the eraser are made to correspond to erasing pressure applied to the clipboard by the eraser via the erase points; determining whether the coordinates of the erase points are the same as one of the coordinates in the handwriting points, and if so, then determining the color depth at that erase point according to a first non-negative rule; otherwise, the color depth at the erase point is the background color depth of the clipboard.

10 Claims, 1 Drawing Sheet

STORING COORDINATES OF EACH HANDWRITING POINT ON AN ELECTRONIC HANDWRITING, AND THE WRITING PRESSURE SUFFERED BY THE RECORD TABLET DURING A PROCESS OF WRITING THE HANDWRITING POINT, IN A ONE-TO-ONE CORRESPONDENCE MODE; AND ENSURING THAT THE COLOR DENSITY OF EACH HANDWRITING POINT ON THE RECORD TABLET IS IN DIRECT PROPORTION TO THE WRITING PRESSURE AT THE HANDWRITING POINT — 101

STORING COORDINATES OF EACH ERASING POINT ON THE RECORD TABLET CONTACTED BY AN ERASER FOR ERASING THE ELECTRONIC HANDWRITINGS, AND THE ERASING PRESSURE APPLIED TO THE RECORD TABLET WHEN THE ERASER PASSES BY THE ERASING POINT, IN A ONE-TO-ONE CORRESPONDENCE MODE — 102

ONE BY ONE JUDGING WHETHER THE COORDINATES OF THE ERASING POINT ARE THE SAME AS THOSE OF THE HANDWRITING POINT OR NOT; DETERMINING A COLOR DENSITY OF THE ERASING POINT ACCORDING TO A FIRST NON-NEGATIVE RULE IF THE COORDINATES OF THE ERASING POINT ARE THE SAME AS THOSE OF ONE HANDWRITING POINT, AND DETERMINING A COLOR DENSITY OF THE ERASING POINT AS THE GROUND COLOR DENSITY OF THE RECORD TABLET IF THE COORDINATES OF THE ERASING POINT ARE NOT THE SAME AS THOSE OF THE HANDWRITING POINT — 103

(56) References Cited

U.S. PATENT DOCUMENTS

| | | | | |
|---|---|---|---|---|
| 2009/0094560 A1* | 4/2009 | Grossman | ............ | G06F 3/04883 715/863 |
| 2010/0306649 A1* | 12/2010 | Russ | .................. | G06F 3/04883 715/702 |
| 2011/0234516 A1 | 9/2011 | Nakajima | | |
| 2013/0120433 A1* | 5/2013 | DiVerdi | ................ | G06T 11/001 345/593 |
| 2015/0193141 A1* | 7/2015 | Goldsmith | .......... | G06F 3/04883 345/173 |

FOREIGN PATENT DOCUMENTS

| CN | 101739150 | 6/2010 |
|---|---|---|
| CN | 104182137 | 12/2014 |

* cited by examiner

METHOD FOR ERASING ELECTRONIC HANDWRITING ON A CLIPBOARD

TECHNICAL FIELD

The present invention relates to a technical field of erasing of electronic handwritings on record tablets, and particularly relates to a method for erasing electronic handwritings on a record tablet.

BACKGROUND

Along with popularization and application of computers, writing and drawing on the record tablet so as to form electronic handwritings has become the main stream of modern work. During writing and drawing processes, errors or regrets are inevitably generated or left, which relates to a problem of erasing the electronic handwritings. An existing method for erasing electronic handwritings on a record tablet is as follows: coordinates of each handwriting point on an electronic handwritings are stored, and then as long as an eraser is contacted with one handwriting point during a process of executing an erasing operation, the color density of the handwriting point is set as the ground color density of the record tablet, so that the erasing purpose is realized. This technology has such disadvantages that since erasing is an irreversible process, the color density of any handwriting point irreversibly becomes the ground color density after erasing is performed. However, this does not conform to a situation that the color density of the handwriting point becomes shallow due to erasing in reality, and the color density cannot be recovered after an erasing misoperation is performed, so that the prior art is relatively poor in humanization degree, and the prior art is inconvenient to use.

BRIEF DESCRIPTION

The present invention aims at providing a method for erasing electronic handwritings on a record tablet, which is capable of improving the humanization degree of electronic handwriting erasing and the convenience in use.

The technical scheme for solving the above technical problem is as follows: a method for erasing electronic handwritings on record tablet comprises the following steps of:

Step 1, storing coordinates of each handwriting point on an electronic handwriting, and the writing pressure suffered by the record tablet during a process of writing the handwriting point, in a one-to-one correspondence mode; and ensuring that the color density of each handwriting point on the record tablet is in direct proportion to the writing pressure at the handwriting point;

Step 2, storing coordinates of each erasing point on the record tablet contacted by an eraser for erasing the electronic handwritings, and the erasing pressure applied to the record tablet when the eraser passes by the erasing point, in a one-to-one correspondence mode;

Step 3, one by one judging whether the coordinates of the erasing point are the same as those of the handwriting point or not; determining a color density of the erasing point according to a first non-negative rule if the coordinates of the erasing point are the same as those of the handwriting point, and determining a color density of the erasing point as the ground color density of the record tablet if the coordinates of the erasing point are not the same as those of the handwriting point, Wherein the first non-negative rule comprises: step 3-1, deducting the erasing pressure at the erasing point from the writing pressure at the erasing point, thereby obtaining a first pressure difference; step 3-2, if the first pressure difference is less than a preset threshold value, determining a color density of the erasing point as the ground color density of the record tablet, otherwise determining that the color density of the erasing point is in direct proportion to the first pressure difference.

The method provided by the present invention has the beneficial effects that the coordinates and writing pressures of the handwriting points as well as the coordinates and erasing pressures of the erasing points are recorded, and the color density of the superposed parts of the handwriting points and the erasing points is determined according to a first non-negative rule through comparing the coordinates of the handwriting points and the erasing points, so that the color density of the erased handwriting points is relevant to the first pressure difference obtained by deducting the erasing pressure from the writing pressure; as long as the first pressure difference is less than the preset threshold value, the color density of the handwriting point only becomes shallow, but not completely become the ground color density of the record tablet, this conforms to the situation that the color density of the handwriting point suffering from relatively slight erasing pressure in reality only becomes shallow, but not completely recover the ground color density, so that the humanization degree of the method is greatly improved, written or drawn electronic handwritings also have different color densities, and the method is relatively convenient to use.

On the basis of the above technical scheme, the method of the present invention also can be improved as follows:

Furthermore, each erasing point is related to at least one erasing approximate point, and the erasing pressure of each erasing approximate point is equal to a value obtained by multiplying the erasing pressure at the erasing point related to the erasing approximate point by a preset weight value related to the erasing approximate point;

The step 2 further comprises: enabling the coordinates of each erasing approximate point related to each erasing point to be in one-to-one correspondence with the erasing pressure at the erasing approximate point;

The step 3 further comprises: one by one judging whether the coordinates of the erasing approximate point are the same as those of the handwriting point or not; determining a color density of the erasing approximate point according to the second non-negative rule if the coordinates of the erasing approximate point are the same as those of the handwriting point, and determining a color density of the erasing approximate point as the ground color density of the record tablet if the coordinates of the erasing approximate point are not the same as those of the handwriting point, Wherein the second non-negative rule comprises: step 3-3, deducting the erasing pressure at the erasing approximate point from the writing pressure at the erasing approximate point, thereby obtaining a second pressure difference; step 3-4, if the second pressure difference is less than a preset threshold value; determining a color density of the erasing approximate point as the ground color density of the record tablet, otherwise determining that the color density of the erasing approximate point is in direct proportion to the second pressure difference.

Furthermore, each erasing point and all erasing approximate points related to each erasing point form a preset stroke sample.

Furthermore, the preset threshold value is 0.

Furthermore, the record tablet is a script graphics tablet, a touch screen or a display.

DETAILED DESCRIPTION

The principle and features of the present invention are further described below with reference to drawings, and the above-mentioned embodiment is merely used for illustrating the present invention and is no way intended to limit the scope of the invention.

The present invention provides a method for erasing electronic handwritings on a record tablet, wherein the record tablet can be realized in diversified modes, for example, a script graphics tablet, a touch screen or a display, which is capable of displaying electronic handwritings, can serve as the record tablet in the present invention. The electronic handwritings refer to handwritings displayed on the record tablet by use of an electronic method, can be drawing on the touch screen or the script graphics tablet, and also can be drawing of a mouse on the display, and the like. Each electronic handwriting consists of at least one handwriting point. In the method of the present invention, the color density of each handwriting point can be the same, and also can be different (i.e., the colors are different in depth).

Figure 1:
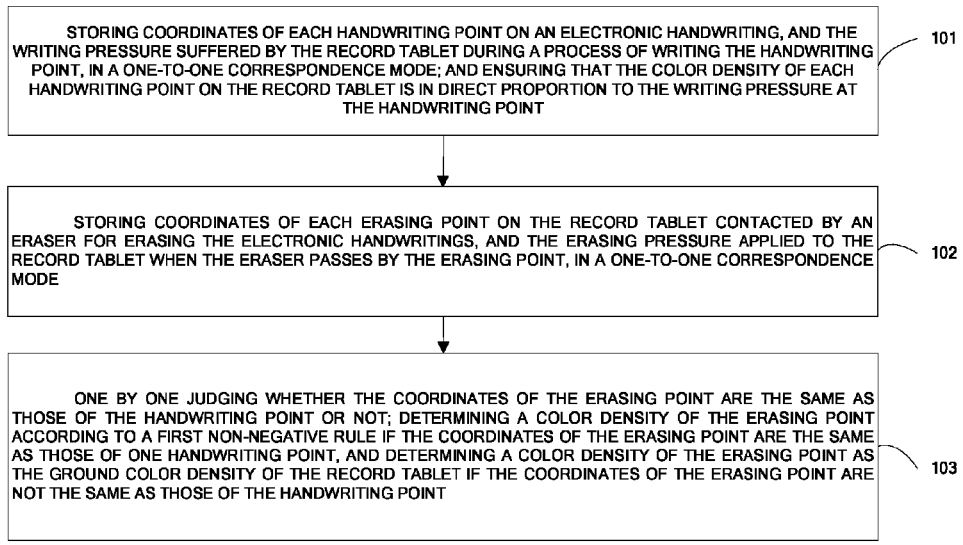
FIG. 1 is a flow chart of a method for erasing electronic handwritings on a record tablet provided by the present invention.

FIG. 1 is a flow chart of a method for erasing electronic handwritings on a record tablet provided by the present invention. As shown in FIG. 1, the method comprises the following steps of:

Step 101, storing coordinates of each handwriting point on an electronic handwriting, and the writing pressure suffered by the record tablet during a process of writing the handwriting point, in a one-to-one correspondence mode; and ensuring that the color density of each handwriting point on the record tablet is in direct proportion to the writing pressure at the handwriting point.

The electronic handwritings root in handwriting movement on the record tablet, the handwriting movement generates certain pressure on the record tablet, the pressure is named as writing pressure in the present invention, the writing pressure and the coordinates of the handwriting points can be transmitted to a storage device through a sensor on the record tablet. When the record tablet is the script graphics tablet or the touch screen, the writing pressure received by the record tablet can be generated by human fingers, pens or other objects capable of generating pressure on the record tablet; when the record tablet is the display, the writing pressure received by the record tablet can be considered to be signal receiving time duration thereof, for instance, the stay time duration of the mouse on the same handwriting point can serve as the writing pressure, the longer the stay time duration of the mouse on the same handwriting point is, the greater the generated writing pressure can be. The record tablet is an electronic handwriting display device, each handwriting point has color, and the color density of any handwriting point is in direct proportion to the writing pressure at the handwriting point during a writing process, so that the same electronic handwriting can have appearance with different color densities (i.e., the colors are different in depth).

Certainly, the step further can comprise: storing the color density of each handwriting point on the record tablet.

Step 102, storing coordinates of each erasing point on the record tablet contacted by an eraser for erasing the electronic handwritings, and the erasing pressure applied to the record tablet when the eraser passes by the erasing point, in a one-to-one correspondence mode;

In the method of the present invention, erasing is realized by the eraser, the electronic handwriting erasing effect of the eraser is similar to the pencil stroke erasing effect of a rubber eraser.

Similar as writing on the record tablet, erasing of the eraser on the record tablet also need to apply a certain pressure to the record tablet, and the pressure is named as the erasing pressure in the method of the present invention. When the record tablet is the script graphics tablet or the touch screen, human fingers, hard objects and the like can serve as the eraser, the erasing pressure can be represented by the actual pressure applied to the record tablet by the eraser; when the record tablet is the display, a mouse can serve as the eraser, and the erasing pressure can be represented by the stay time duration of the mouse at the erasing point.

Step 103, one by one judging whether the coordinates of the erasing point are the same as those of the handwriting point or not; determining a color density of the erasing point according to a first non-negative rule if the coordinates of the erasing point are the same as those of the handwriting point, and determining a color density of the erasing point as the ground color density of the record tablet if the coordinates of the erasing point are not the same as those of the handwriting point.

The first non-negative rule in the method of the present invention comprises: step 103-1, deducting the erasing pressure at the erasing point from the writing pressure at the erasing point, thereby obtaining a first pressure difference; step 103-2, if the first pressure difference is less than a preset threshold value, determining a color density of the erasing point as the ground color density of the record tablet, otherwise determining that the color density of the erasing point is in direct proportion to the first pressure difference.

Since "erasing" in the method refers to "modifying the color density of the handwriting point by use of the eraser", and different from "completely eliminating the electronic handwritings at the handwriting point and recovering the color densities of the electronic handwritings as the ground color of the record tablet" in the prior art, the result of modifying the color density at the handwriting point can be completely eliminating the electronic handwriting at the handwriting point, and also can be reducing the color density instead of completely eliminating the color density. Therefore, an effect with different color densities can be generated by the electronic handwritings on the record tablet, so that the resolution ratio of the electronic handwritings on the record tablet is improved.

In order to effectively erase the electronic handwritings at certain handwriting point, the position of the erasing point is generally quite close to the handwriting point. The step comprises: one by one judging whether the coordinates of the erasing point are the same as those of the handwriting point, so as to determine whether the erasing pressure is applied to the handwriting point by the eraser or not, if the erasing pressure is applied to the handwriting point by the eraser, indicating that the eraser executes an erasing operation on the handwriting point, and then further determining the difference between the writing pressure and erasing pressure at the handwriting point through the step 103-1, thereby determining the updated color density of the handwriting point according to the step 103-2. Of course, with regard to a non-handwriting point, even if the erase applies a pressure to the non-handwriting point, since the color density of the non-handwriting point is originally the ground color density of the record tablet, the updated color density is constant.

In the step 103-2 of the first non-negative rule, if the first pressure difference is less than the preset threshold value, which indicates that the erasing pressure applied to the handwriting point by the eraser is relatively less, and is insufficient to counteracting the writing pressure applied in a process of writing in the handwriting point, the color density of the handwriting point cannot become the ground color density of the record tablet and only becomes shallow. However, if the first pressure difference is not less than the preset threshold value, which indicates that the erasing pressure applied to the handwriting point by the eraser is relatively large, and is insufficient to counteracting the writing pressure applied in a process of writing in the handwriting point so as to completely eliminate the electronic handwriting at the handwriting point and recover the color density of the electronic handwriting as the ground color density of the record tablet, the color density of the handwriting point is recovered as the ground color density of the record tablet, so as to meet the requirements of a user.

This shows that the coordinates and writing pressures of the handwriting points as well as the coordinates and erasing pressures of the erasing points are correspondingly recorded, and the color density of the superposed parts of the handwriting points and the erasing points is determined according to a first non-negative rule through comparing the coordinates of the handwriting points and the erasing points, so that the color density of the erased handwriting points is relevant to the first pressure difference obtained by deducting the erasing pressure from the writing pressure; as long as the first pressure difference is less than the preset threshold value, the color density of the handwriting point only becomes shallow, but not completely become the ground color density of the record tablet, this conforms to the situation that the color density of the handwriting point suffering from relatively slight erasing pressure in reality only becomes shallow, but not completely recover the ground color density, so that the humanization degree of the method is greatly improved, written or drawn electronic handwritings also have different color densities, and the method is relatively convenient to use.

The embodiment of the FIG. 1 describes the present invention by taking the contact area of the eraser and the record tablet as one erasing point; however, generally in real life, the contact area of the eraser and the record tablet is relatively large, for example, during an erasing operation, the contact area of a finger and the touch screen is much larger than pixels of the touch screen, so that the contact area of the eraser and the record tablet generally has multiple points, and the eraser applies same or different erasing pressures to all the points. In one contact between the eraser and the record tablet, one of points suffering from the erasing pressure can be selected to serve as the erasing point of the embodiment of the FIG. 1 according to the selection principle, and other points suffering from the erasing pressure, except for the point, serve as the erasing approximate points related to the erasing point, and the selection principle can be diversified according to specific needs, for example, the point suffering from the maximal erasing pressure, among the points suffering from the erasing pressure can be selected as the erasing point, the center point of the contact area of the eraser and the record tablet can be selected as the erasing point, and the like.

In order to achieve convenience and practicability, the present invention stipulates that each erasing point and all erasing approximate points related to each erasing point form a preset stroke sample. The stroke sample can be a preset figure, such as a square region which takes the erasing point as a central point and has preset length, or a rectangular region which takes the erasing point as a point at the top left corner and has preset length and width, or a round region which takes the erasing point as a circle center and has preset radius, and the like. The stroke sample can be obtained by calculation of a preset function, for example, a semi-period cosine figure (a symmetry axis passes through the erasing point) calculated according to the cosine function by taking the erasing point as an original point is taken as the stroke sample, and the like. Thus it can be seen that the position relation between the erasing point and all the erasing approximate points related to the erasing point is stipulated.

On this occasion, one erasing point is obtained by one contact between the eraser and the record tablet, and the eraser contacts with the record tablet for multiple times so as to realize a preset erasing purpose, so that during one erasing operation, the total number of the erasing points is the same as the contact frequency of the eraser and the record tablet.

Each erasing point is related to at least one erasing approximate point, and the erasing pressure of each erasing approximate point can be sensed by the sensor and also can be calculated according to the erasing pressure at the erasing point related to the erasing approximate point; one calculation method is as follows: the erasing pressure of each erasing approximate point is equal to a value obtained by multiplying the erasing pressure at the erasing point related to the erasing approximate point by a preset weight value related to the erasing approximate point. Under a condition that the contact area of the eraser and the record tablet is known, the preset weight value is a known quantity, the preset weight values related to all the erasing approximate points can be the same or can be different, for example, the preset weight values related to all the erasing approximate points can be distributed according to the cosine rule and can be randomly distributed.

In consideration of the existence of the erasing approximate points, the step 102 further comprises: enabling the coordinates of each erasing approximate point related to each erasing point to be in one-to-one correspondence with the erasing pressure at the erasing approximate point;

the step 103 further comprises: one by one judging whether the coordinates of the erasing approximate point are the same as those of the handwriting point or not; determining a color density of the erasing approximate point according to the second non-negative rule if the coordinates of the erasing approximate point are the same as those of the handwriting point, and determining a color density of the erasing approximate point as the ground color density of the record tablet if the coordinates of the erasing approximate point are not the same as those of the handwriting point, Wherein the second non-negative rule comprises: step 103-3, deducting the erasing pressure at the erasing approximate point from the writing pressure at the erasing approximate point, thereby obtaining a second pressure difference; step 103-4, if the second pressure difference is less than a preset threshold value; determining a color density of the erasing approximate point as the ground color density of the record tablet, otherwise determining that the color density of the erasing approximate point is in direct proportion to the second pressure difference.

Thus it can be seen that the second non-negative rule is basically the same as the first non-negative rule, and an object with to-be-determined color density becomes the erasing approximate point.

In consideration of the erasing approximate point, the method provided by the present invention further improves the simulation degree of an erasing operation in reality, and is relatively convenient to use.

The above first non-negative rule and second non-negative rule relate to the preset threshold value, the preset threshold value in the method of the present invention can be 0, and also can be other values, such as a minimal pressure value sensed by the sensor on the record tablet.

Figure 2:
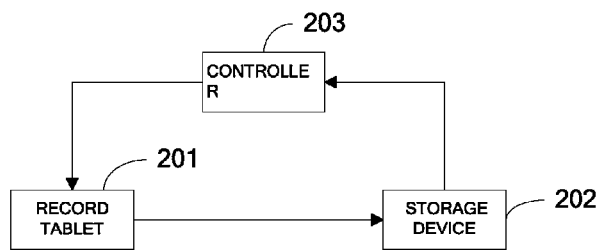
FIG. 2 is a structural drawing of a system applying the method provided by the present invention.

FIG. 2 is a structural drawing of a system applying the method provided by the present invention. As shown in the FIG. 1, the system comprises a record tablet 201, a storage device 202 and a controller 203; after the realization mode (such as the script graphics tablet, the touch screen, the display device and the like) of the record tablet 201 is determined, the realization modes of the eraser and writing tools for writing on the record tablet can be determined.

The record tablet 201 is used for sensing the coordinates and erasing pressures of pressure application points (the erasing point and the erasing approximate points) of the eraser, the coordinates and writing pressures of writing pressure application points (handwriting points) of the writing tools, and the sensing effect is realized by the sensor.

The storage device 202 is used for storing coordinates and erasing pressures of the erasing points and the erasing approximate points transmitted by the record tablet 201 in one-to-one correspondence, and recording the coordinates and writing pressures of the handwriting points transmitted by the record tablet in one-to-one correspondence.

The controller 203 is used for invoking data from the storage device 202; determining a color density of each erasing point according to a first non-negative rule; determining a color density of each erasing approximate point according to the second non-negative rule, and transmitting the color densities of these points to the record tablet 201, so that the record tablet can update the color density display situations of all the points so as to supply visual recognition to a user.

Thus it can be seen that, the method of the present invention has the following advantages that:

(1) the coordinates and writing pressures of the handwriting points as well as the coordinates and erasing pressures of the erasing points are correspondingly recorded, and the color density of the superposed parts of the handwriting points and the erasing points is determined according to a first non-negative rule through comparing the coordinates of the handwriting points and the erasing points, so that the color density of the erased handwriting points is relevant to the first pressure difference obtained by deducting the erasing pressure from the writing pressure; as long as the first pressure difference is less than the preset threshold value, the color density of the handwriting point only becomes shallow, but not completely become the ground color density of the record tablet, this conforms to the situation that the color density of the handwriting point suffering from relatively slight erasing pressure in reality only becomes shallow, but not completely recover the ground color density, so that the humanization degree of the method is greatly improved, written or drawn electronic handwritings also have different color densities, and the method is relatively convenient to use.

(2) The result of modifying the color density at the handwriting point can be completely eliminating the electronic handwriting at the handwriting point, and also can be reducing the color density instead of completely eliminating the color density. Therefore, an effect with different color densities can be generated by the electronic handwritings on the record tablet, so that the resolution ratio of the electronic handwritings on the record tablet is improved.

(3) According to the present invention, in consideration of the erasing approximate points, the method provided by the present invention further improves the simulation degree of an erasing operation in reality, and is relatively convenient to use.

What is mentioned above is merely the preferred embodiment of the present invention, however, the present invention is not limited to the above-mentioned embodiment, and any modification, equivalent replacement or improvement within the spirit and principles of the present invention should fall within the protection scope of the present invention.

The invention claimed is:

1. A method for erasing electronic handwritings on a record tablet, comprising:
    Step 1, storing coordinates of each handwriting point on an electronic handwriting, and the writing pressure suffered by the record tablet during a process of writing the handwriting point, in a one-to-one correspondence mode; and ensuring that the color density of each handwriting point on the record tablet is in direct proportion to the writing pressure at the handwriting point;
    Step 2: storing coordinates of each erasing point on the record tablet contacted by an eraser for erasing the electronic handwritings, and the erasing pressure applied to the record tablet when the eraser passes by the erasing point, in a one-to-one correspondence mode; and,
    Step 3: one by one judging whether the coordinates of the erasing point are the same as those of the handwriting point or not; determining a color density of the erasing point according to a first non-negative rule if the coordinates of the erasing point are the same as those of the handwriting point, and determining a color density of the erasing point as the ground color density of the record tablet if the coordinates of the erasing point are not the same as those of the handwriting point,
    Wherein, the first non-negative rule comprises: step 3-1, deducting the erasing pressure at the erasing point from the writing pressure at the erasing point, thereby obtaining a first pressure difference; step 3-2, if the first pressure difference is less than a preset threshold value, determining a color density of the erasing point as the ground color density of the record tablet, otherwise determining that the color density of the erasing point is in direct proportion to the first pressure difference.

2. The method according to the claim 1, wherein, each erasing point is related to at least one erasing approximate point, and the erasing pressure of each erasing approximate point is equal to a value obtained by multiplying the erasing pressure at the erasing point related to the erasing approximate point by a preset weight value related to the erasing approximate point;
    The step 2 further comprises: enabling the coordinates of each erasing approximate point related to each erasing point to be in one-to-one correspondence with the erasing pressure at the erasing approximate point; and, The step 3 further comprises: one by one judging whether the coordinates of the erasing approximate point are the same as those of the handwriting point or not; determining a color density of the erasing approximate point according to the second non-negative rule if the coordinates of the erasing approximate point are the same as those of the handwriting point, and determining a color density of the erasing approximate point as the ground color density of the record tablet if the coordinates of the erasing approximate point are not the same as those of the handwriting point, Wherein the second non-negative rule comprises: step 3-3, deducting the erasing pressure at the erasing approximate point from the writing pressure at the erasing approximate point, thereby obtaining a second pressure difference; step 3-4, if the second pressure difference is less than a preset threshold value; determining a color density of the erasing approximate point as the ground color density of the record tablet, otherwise determining that the color density of the erasing approximate point is in direct proportion to the second pressure difference.

3. The method according to the claim 2, wherein, each erasing point and all erasing approximate points related to each erasing point form a preset stroke sample.

4. The method according to claim 2, wherein, the preset threshold value is 0.

5. The method according to claim 2, wherein, the record tablet is a script graphics tablet, a touch screen or a display.

6. The method according to claim 3, wherein, the preset threshold value is 0.

7. The method according to claim 3, wherein, the record tablet is a script graphics tablet, a touch screen or a display.

8. The method according to claim 1, wherein, the preset threshold value is 0.

9. The method according to claim 8, wherein, the record tablet is a script graphics tablet, a touch screen or a display.

10. The method according to claim 1, wherein, the record tablet is a script graphics tablet, a touch screen or a display.

* * * * *